Inventor
Edward W. Miller
by Wright, Brown, Quinby & May
Attys.

May 13, 1952      E. W. MILLER      2,596,343
GEAR SHAPING MACHINE WITH ECCENTRIC CUTTER RELIEF
Filed Feb. 9, 1949      3 Sheets-Sheet 2
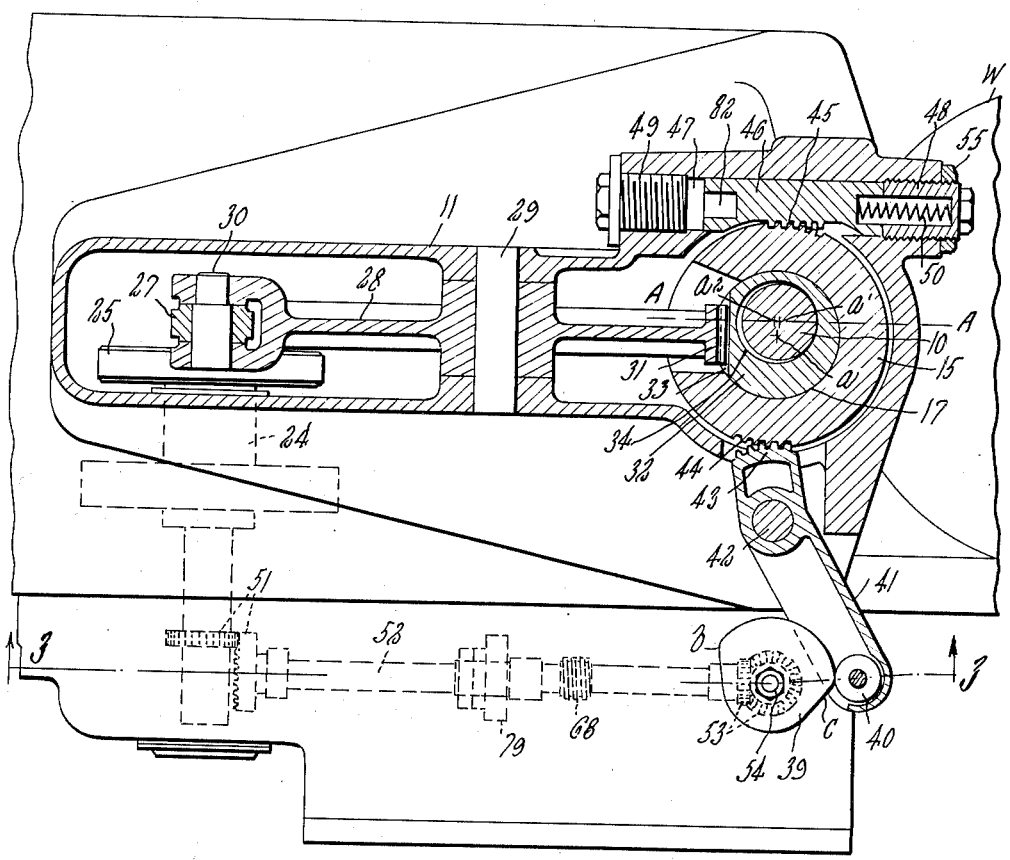
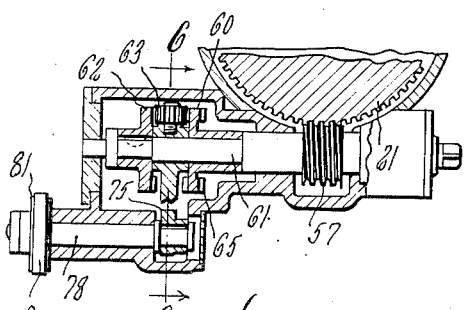
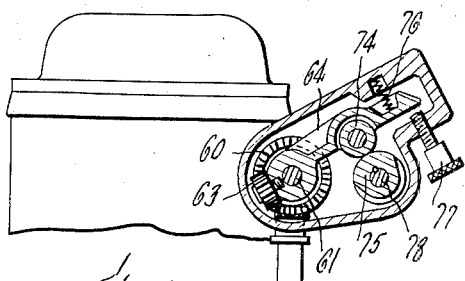

Patented May 13, 1952

2,596,343

UNITED STATES PATENT OFFICE 2,596,343

GEAR SHAPING MACHINE WITH ECCENTRIC CUTTER RELIEF

Edward W. Miller, Springfield, Vt., assignor to The Fellows Gear Shaper Company, Springfield, Vt., a corporation of Vermont Application February 9, 1949, Serial No. 75,328

12 Claims. (Cl. 90—7)

The present invention relates to gear shaping machines for generating and cutting gear teeth by the action of a gear-like cutter with relative axial reciprocation between the cutter and work piece and simultaneous generative rotation of both. It is more particularly concerned with means for relieving or backing off the cutter from the work piece when noncutting strokes are performed so as to avoid rubbing contact of the cutter teeth with the work at such times. Its object is to effect backing off and return movements of the cutter by oscillation of eccentrically disposed, relatively rotative, means. A further object is to combine with such eccentric cutter relieving means other means for imparting a degree of rotation to the cutter concurrently with its backing off movements in such manner as to clear any part of the unfinished work piece that may be in overlapping or interfering relation with one or more of its teeth.

Parts of a gear shaping machine containing an illustrative embodiment of the present invention are described in the following specification with reference to the accompanying drawings, in which, Fig. 1 is a vertical section of the cutter head of such a machine with a cutter spindle therein and so much of the mechanism for reciprocating, rotating, and backing off the spindle as is needed for disclosure of the invention;

Fig. 2 is a cross section of the machine on line 2—2 of Fig. 1, with a showing in plan of parts of the machine below that line;

Fig. 5 is a horizontal section on line 5—5 of Fig. 3;

Fig. 6 is a cross section on line 6—6 of Fig. 5;

Like reference characters designate the same parts wherever they occur in all the figures.

Figure 1:
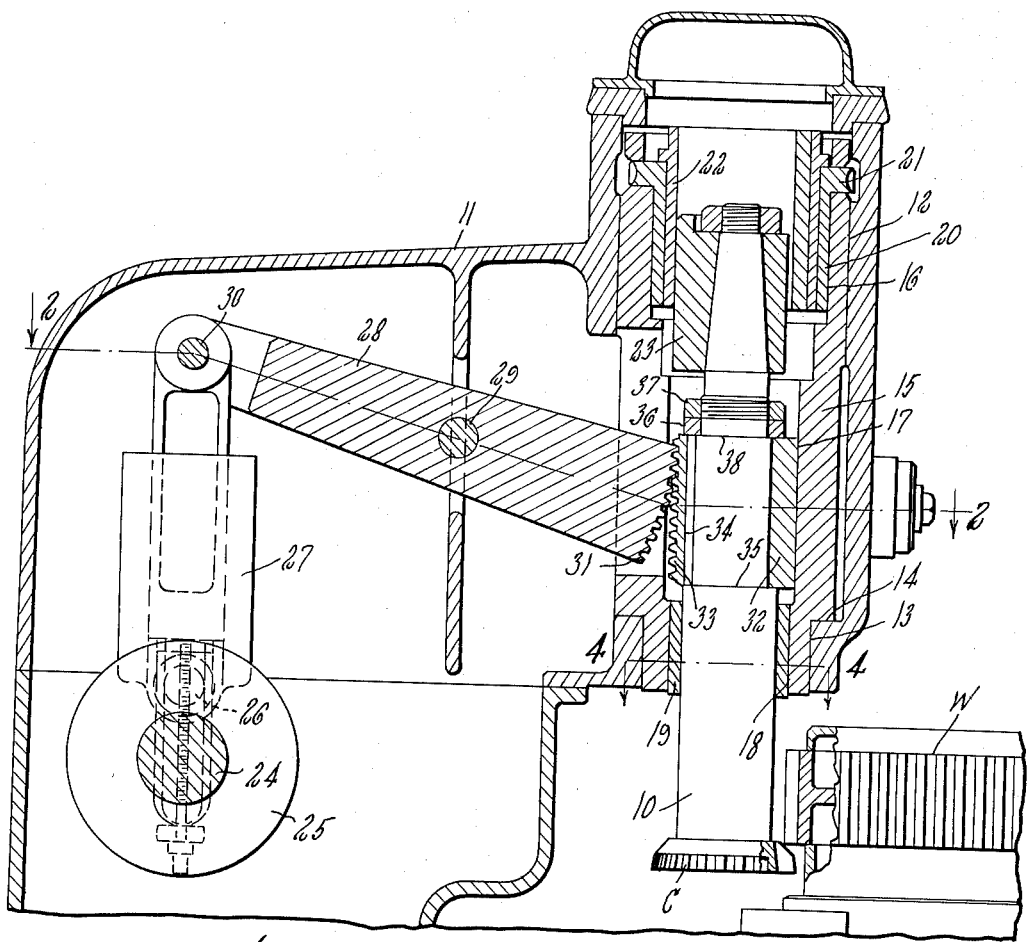

In this illustration, a gear shaping cutter C is secured to the lower end of an upright cutter spindle 10, which is suitably mounted to reciprocate and rotate in a cutter head 11, and is operatively located with respect to a work piece W for generating teeth in the latter. In accordance with common practice in this art, the cutter head and a work spindle to which the work piece is connected are mounted on a base with provisions for movement of relative approach and recession so as to accommodate work pieces of different diameters, to accomplish a relative feeding movement between cutter and work to prescribed depth and separate them to permit changing the work pieces, and to enable the cutter to generate either external or internal gears.

The part of the cutter head 11 in which the cutter spindle 10 is contained is bored to provide an internal cylindrical bearing surface 12 in its upper part and a coaxial cylindrical bearing surface 13 of smaller diameter in its lower part. It is formed with a shoulder 14 at the upper end of the bearing 13.

Figures 3, 4:
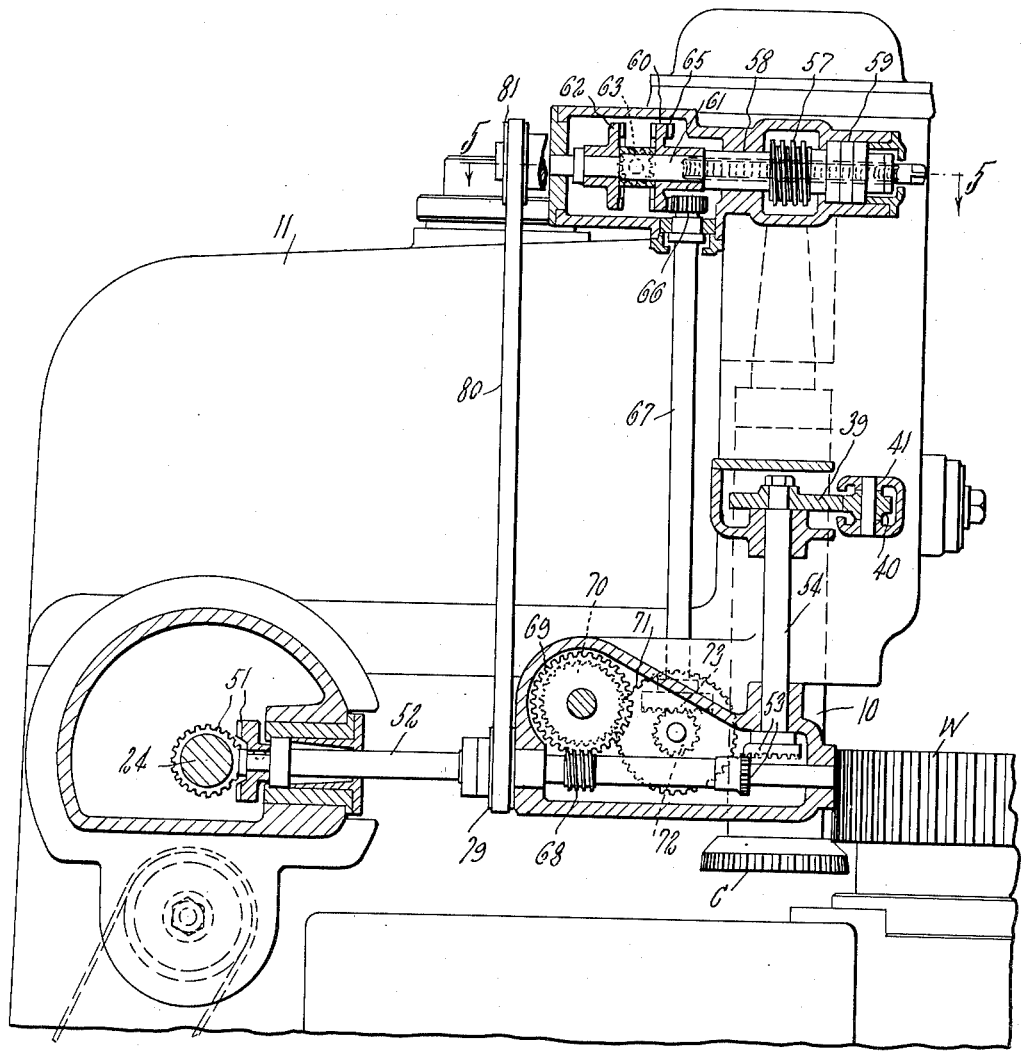
Fig. 3 is a vertical section on line 3—3 of Fig. 2.
Fig. 4 is a detail cross section on line 4—4 of Fig. 1.

A sleeve member 15 is fitted to rotate in the bearings 12 and 13 and is formed with a shoulder near its lower end to rest on shoulder 14. It has three internal cylindrical bearing surfaces or bores 16, 17 and 18 in tandem arrangement and of successively smaller diameters from the uppermost to the lowermost one. The bores 16 and 18 are eccentric to the bearings 12 and 13 but coaxial with each other, and their eccentricity is transverse (preferably approximately perpendicular) to the line of centers of the cutter spindle 10 and the work piece W, while the bore 17 is concentric with bearings 12 and 13. This relationship is shown in Figs. 2 and 4, where $a$ is the axis of the bearings 12, 13 and 17, $a^1$ the axis of the bores or bearings 16 and 18, and of the cutter spindle 10, and A—A is the line of centers of cutter and work.

A bearing sleeve or bushing 19 having coaxial external and internal cylindrical surfaces, is fitted in the bore 18 of sleeve 15. It provides a lower bearing and guide for the cutter spindle 10, its inner circumference or bore having a close sliding fit therewith.

The uppermost bore 16 of sleeve 15 serves as a bearing for the hub 20 of a worm wheel 21, which corresponds with the customary upper worm wheel, or so called cutter index wheel, of the well known types of gear shaping machines. It is coupled with the spindle 10 by guides 22 and 23 of well known character, which permit reciprocation of the spindle while transmitting rotation thereto and the complemental guiding surfaces of which may be either parallel to the spindle axis for use in cutting straight teeth, or helical for use in cutting helical teeth.

Reciprocating movement is imparted to the cutter spindle 10 by a drive shaft 24, having a crank disk 25, a crank pin 26 radially adjustable on the disk 25, a telescopic connecting rod 27, a lever 28 mounted on a stationary pivot 29, one of the arms of which is coupled by a wrist pin 30 with connecting rod 27, and the other arm of which carries a gear segment 31, and a sleeve 32 which surrounds the spindle and has rack teeth 33 at one side meshing with the teeth of gear segment 31. The exterior of sleeve 32 is cylindrical and is fitted rotatably within the bore 17 of sleeve 15 which, as previously stated, is concentric with the bearings 12 and 13. The interior circumference or bore 34 of sleeve 32 is larger in diameter than the part of the spindle 10 which it surrounds and is eccentric to the spindle in the direction of the line of centers A—A; the spindle axis being indicated at $a^1$, and the axis of bore 34 at $a^2$. The eccentricity $a^1$—$a^2$ of bore 34 is great enough to permit the prescribed backing off or relief movement of the cutter.

Sleeve 32 is confined between a shoulder 35 on the spindle at one end of the sleeve and a washer 36 and lock nut 37 at the other end, the washer bearing on a shoulder 38 of the spindle. The distance between shoulders 35 and 38 is enough greater than the length of sleeve 32 to permit the spindle to move freely laterally with respect to the sleeve, but not great enough to allow any appreciable backlash in the reciprocating movement.

By reason of the close sliding fit of the reciprocation-transmitting sleeve 32 in the concentric bore 17 of the sleeve 15, such lateral thrust as is developed by the sector 31 is taken up by the sleeve 15, and the mating teeth of sector 31 and rack 33 are held in continuous uniform mesh. There is no inward and outward displacement of the rack teeth with respect to the sector teeth as there would be if the transmission sleeve 32 were secured rigidly to the spindle so as to move back and forth laterally therewith.

Due to the accentric relationship of the spindle axis $a^1$ to the axis $a$ of the bearings 12 and 13 in which sleeve 15 is rotatable, oscillation of sleeve 15 about the latter axis causes the spindle to be moved laterally back and forth along the line of centers A—A, its axis $a^1$ traveling in a short arc of which the deviation from the line of centers is inappreciable. For thus oscillating the sleeve 15, (which for the purpose of this description and to distinguish it from sleeve 32, may be called the eccentric sleeve), a back off cam 39 is provided and is arranged to bear on a follower roll 40 carried by one arm of a lever 41 mounted on a pivot stud 42 and having a gear sector arm 43 which meshes with gear teeth 44 cut in the adjacent side of the accentric sleeve 15. At its opposite side, the sleeve is provided with teeth 45 in mesh with teeth on the contiguous side of a rack bar 46 which is slidably mounted in a guideway 47 formed in an integral part of the cutter head 11. This guideway extends entirely through the part in which it is formed and is closed at its opposite ends by removable screw plugs 48 and 49. A spring 50 is contained within registering sockets in plug 48 and the adjacent end of rack bar 46 and exerts force through the rack bar on the eccentric sleeve 15 in the direction which maintains contact of follower roll 40 on cam 39 and eliminates backlash between the cam and gear teeth 44.

The back off cam 39 is rotated in time with the reciprocations of the cutter spindle and is formed with rising or descending surfaces $b$ and $c$ (either of which can be considered as a rise and the other as a descent, depending on the direction of rotation of the cam), at opposite sides of its axis. These eccentric portions are located to cause rotation of the eccentric sleeve 15 counterclockwise at the end of the cutting stroke and clockwise rotation at the end of the return stroke while the cutter is clear of the work.

In the present embodiment, the back off cam 39 is driven from the crank shaft 24 by a pinion and face gear couple 51, a shaft 52, a second pinion and face gear couple 53, and an upright shaft 54, on opposite ends of which the face gear of the last mentioned couple and the cam 39 are secured.

The plug 48 previously mentioned is located to serve as a stop or abutment for the rack bar 46 when moved by the back off cam against the pressure of spring 50. The plug can be adjusted by rotation, and secured by a lock nut 55, so as to afford a rigid stop for the eccentric sleeve when the cutter spindle is brought to cutting position by the back off cam.

Figures 7, 9:
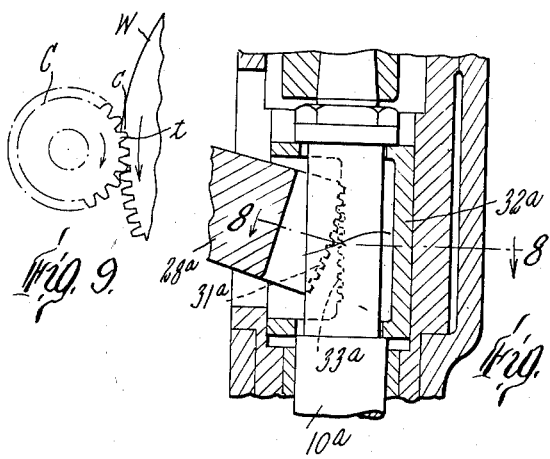
Fig. 7 is a fragmentary sectional view similar to a portion of Fig. 1 showing a variation of means for reciprocating the cutter spindle.
Fig. 9 is a plan view of a fragment of a work gear and a cutter in course of generating teeth therein, showing an overlap between the unfinished part of the work piece and the cutter such as frequently occurs in gear shaping procedure.

Provision is made for imparting angular movement to the cutter spindle about its axis $a^1$ other than, or additional to, its generating rotation, in order to avoid lateral pressure of the cutter teeth on the work in the backing off movement. Such lateral pressure may be due to overlap of a portion of the work piece with respect to one or more of the cutter teeth, to rotation of the index worm wheel 21 due to backing off, or a combination of both. Fig. 9 illustrates overlap between the work piece and a cutter tooth such as frequently occurs when the work piece is substantially larger in diameter than the cutter, and when internal gears are being cut. Here the cutter tooth $t$, in the course of penetrating into the work piece, is overlapped by an uncut portion $c$ of the work piece, and would rub laterally against such overlapping portion in backing off, in the absence of preventive correction. Also, in backing off of the cutter spindle, the index worm wheel 21, which is shifted laterally with the spindle, rolls lengthwise of its driving worm 57. The latter, as shown by Fig. 3, is mounted in bearings 58 and 59 with its axis parallel to the line of centers A—A, whereby it acts as a rack to impart rotation to the worm wheel in the backing off movement; such rotation being added to that, caused by the rotation of the worm, which imparts the prescribed generative rotation to the cutter.

I have provided a means by which the worm 57 is rotated incrementally in the proper direction and to the necessary extent to cancel out the rack effect above mentioned, and also to swing the cutter away from an overlapping part of the work piece when such is present. Such means, in the present illustrative embodiment, comprises a planetary differential gearing coupled to rotate the worm and mechanism for shifting the planet element of such gearing in the proper manner.

This differential gearing comprises a sun gear 60 mounted and rotatable on the shaft 61 of worm 57, a sun gear 62 keyed to the shaft and a planet pinion 63 between the sun gears, in mesh with both, and rotatably mounted on a pinion carrier 64 mounted to rotate about the shaft 61. Sun gear 60 is provided with an additional series of teeth 65 on its outer face with which meshes a driving pinion 66 on an upright shaft 67. Shaft 52 drives shaft 67 through a gear train consisting of a worm 68 on shaft 52, worm gear 69 meshing therewith, gear 70 on the same shaft with 69, gear 71 meshing with 70, pinion 72 on the same shaft with gear 71, and face gear 73 meshing with pinion 72 and fixed to shaft 67.

Pinion carrier 64 is furnished with a cam follower roll 74 which bears on a cam 75 under the force of gravity and the pressure of a spring 76. An adjustable stop screw 77 is mounted in a wall of the housing which encloses the differential gearing and is arranged as a stop to be engaged by an extension of the pinion carrier 64 to limit the extent to which the carrier may follow receding portions of the cam. This stop may be adjusted so as to permit movements of the carrier throughout the full throw of the cam, or any part thereof.

Cam 75 may be distinctively designated for the purpose of this description, the differential controlling cam. It is secured to a shaft 78 and driven from the shaft 52 by a belt or chain drive 79, 80, 81 (Fig. 3). It has suitable rising and descending portions, and is suitably timed with respect to the back off cam to cause an angular movement of the pinion carrier 64 at the same time when an angular movement is given to the eccentric sleeve 15 by the back off cam 39. The movements of the pinion carrier occur in alternately opposite directions and impart incremental rotation to the worm 57 in acceleration or deceleration of the angular velocity due to the sun gear 60 and in the proper directions to compensate for the rack effect of the worm. The extent of such incremental movements is regulated by adjustment of stop screw 77.

This backing off mechanism is reversible to change it from the condition for acting on external gears (that represented in the drawings), to condition for acting on internal gears. The axes of the eccentric sleeve 15, of the pivot 42, and of the shaft 54 are all parallel and in the same plane perpendicular to the line of centers A—A; and the plugs 48 and 49 are interchangeable. To reverse the condition, lever 41 is removed from its pivot, inverted and replaced with its roll 40 at the opposite side of the back off cam 39 from the position shown in the drawing, and the plug 48 is placed in the position previously occupied by plug 49, spring 50 being then inserted into a socket 82 in the adjacent end of rack bar 46 and plug 49 being placed in the opening vacated by plug 48. The rising thrust of cam 39 then causes the spindle to be forced toward the left (with respect to these drawings) so that the cutter is brought into the cutting path, and the receding portion of the cam causes the spindle and cutter to be backed off.

Figure 8:
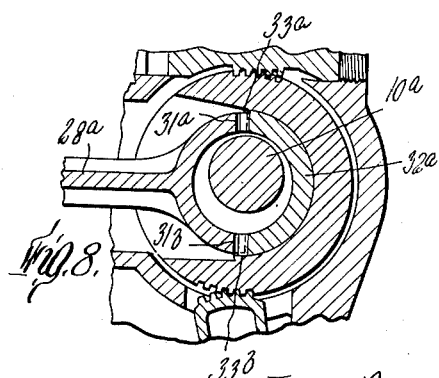
Fig. 8 is a horizontal section taken on line 8—8 of Fig. 7.

An alternative construction of the gearing for reciprocating the cutter spindle is shown in Figs. 7 and 8. Here the reciprocation transmitting sleeve 32a is cut away throughout the major part of its length between its ends to approximately a diametral plane and is provided with two racks 33a and 33b, and the arm 28a of the operating lever is forked so as to straddle the cutter spindle 10a and the extremities of both arms of the fork are formed as gear segments 31a and 31b, respectively, meshing with said racks. Otherwise the machine containing this modification is the same as that previously described, and the action of the duplex gear segments and racks is equivalent to that of the single segment and rack combination shown in Figs. 1 and 2.

It should be noted that the pivot 29 of the lever 28 which reciprocates the cutter spindle, and the pivot 42 of the lever 41 which rotates the eccentric sleeve, are both mounted in or on the cutter head 11 so that the relation of these levers to the parts which they actuate remains the same in all positions of the cutter head.

What I claim is:

1. In a shaping machine having a reciprocable and rotatable cutter spindle, a cutter carried by said spindle, a gear engaged with said spindle and a worm meshing with said gear for rotating the spindle, the combination of a sleeve surrounding said spindle and a portion of said gear mounted to rotate about its axis and having internal bearing surfaces eccentric to its axis in which said spindle and gear are fitted rotatably, means for turning the sleeve back and forth about its axis to back off the spindle and return it to a prescribed cutting path, and means for simultaneously imparting an incremental angle of rotation to said worm, whereby to turn the cuter so as to clear it of lateral contact with the work during backing off movements.

2. In a shaping machine, a supporting structure, a sleeve mounted in said structure for rotary movement about its axis and having an internal bearing eccentric to its bearing in the supporting structure, a spindle in reciprocally guided relation with said eccentric bearing, a reciprocation-transmitting sleeve surrounding the spindle having an external cylindrical surface in bearing engagement with an internal bearing on the first named sleeve which is concentric with the bearing of the sleeve in the supporting structure, said transmitting sleeve having a bore larger in diameter than the portion of the spindle which it surrounds and being confined on the spindle against axial movement relative thereto, and a machine element operatively engaged with said sleeve to impart axial reciprocation thereto.

3. In a machine tool, a supporting structure having internal bearing surfaces, a sleeve mounted to rotate about its axis in engagement with said bearing surfaces, having an internal bearing surface coaxial with the before named bearing surfaces, and other bearing surfaces eccentric thereto, a cutter spindle fitted to reciprocate and rotate in one of said eccentric bearing surfaces, a gear element engaged with said spindle to transmit rotation thereto and fitted to rotate in another of said eccentric bearing surfaces, a worm meshing with said gear in rotation transmitting relation thereto, a reciprocation-transmitting sleeve surrounding a portion of the spindle and confined thereon against relative axial movement, said sleeve having an external surface fitted rotatably in the concentric internal bearing surface of the first named sleeve and a bore larger in diameter than the portion of the spindle which it surrounds, mechanism engaged with said reciprocation-transmitting sleeve to impart axial reciprocating movement thereto, mechanism engaged with the first named sleeve for oscillating it about its axis, and means for simultaneously imparting a degree of incremental rotation to said gear element.

4. In a gear shaping machine, the combination of a reciprocative and rotative cutter spindle, a cutter carried by the spindle, an eccentric sleeve in which said spindle has a rotative and axially reciprocative bearing mounted to rotate about an axis parallel and eccentric to the axis of the spindle, whereby oscillation of the sleeve through a small angle causes back and forth lateral movement of the spindle and cutter, a gear coaxial with the spindle and coupled therewith to transmit rotation thereto, rotatable in said sleeve, a worm meshing with said gear mounted with its axis substantially parallel to the direction of such lateral movement, means for reciprocating said spindle axially, means for turning said eccentric sleeve first in one direction at the end of one stroke of the spindle and in the opposite direction at the end of the opposite stroke of the spindle, means for rotating the worm so as to impart progressive rotation to the spindle and cutter, and means for imparting an incremental degree of rotation to the worm at the times when the eccentric sleeve is so rotated.

5. In a shaping machine, a reciprocative cutter carrier, a cutter secured to said carrier, a sleeve mounted to turn about an axis extending in the same direction as the reciprocative movement of said carrier and having a sliding and rotative bearing engagement with the carrier on an axis parallel and eccentric to its own axis of rotation, means for turning said sleeve back and forth about its axis of rotation to impart lateral back and forth movement to said carrier and cutter, a reciprocation-transmitting sleeve coupled with said carrier having a rack element extending along the direction of the reciprocating movements of the carrier, a gear segment meshing with said rack element and means for oscillating said gear segment whereby to impart reciprocating movements to the carrier; said reciprocation-transmitting sleeve having a bearing in the first named sleeve coaxial with the rotative axis of the latter and having an internal passageway through which said carrier extends and which is wider than the portion of the carrier which it embraces.

6. In a shaping machine, a supporting structure, a sleeve mounted rotatably in said supporting structure having external and internal bearing surfaces of which the axes are parallel and eccentric to one another, a spindle coaxial with the internal bearing surface of said sleeve in confined and guided relation therewith for endwise movement, means for reciprocating said spindle endwise, a back off cam, and a lever engaged with said cam and having torque transmitting connection with said sleeve whereby to turn the sleeve and cause lateral movement of the spindle, the axes of said sleeve and of the cam and the pivot axis of the lever being parallel to one another and in the same plane, and the lever being constructed for reversal on its pivot so as to engage said cam on one side or the opposite side of the axis of the cam.

7. In a shaping machine, a supporting structure, a sleeve mounted rotatably on said supporting structure and having an internal bearing portion eccentric to the axis about which it is adapted to rotate, an endwise movable cutter carrier in confined and guided relation with said internal bearing portion, whereby it is displaced transversely when the sleeve is rotated, a lever pivotally mounted beside said sleeve having an arm in rotation-transmitting connection with the sleeve, a rotatably driven back off cam, said lever having a second arm in engagement with said cam, a machine element having rotation-transmitting engagement with said sleeve, and a yieldable force-applying member arranged to act on said sleeve in a direction for torque transmission opposite to the torque transmission force applied by said cam through said lever to the sleeve.

8. In a shaping machine, a supporting structure, a sleeve mounted rotatably on said supporting structure and having an internal bearing portion eccentric to the axis about which it is adapted to rotate, an endwise movable cutter carrier in confined and guided relation with said internal bearing portion whereby it is displaced transversely when the sleeve is rotated, a lever pivotally mounted beside said sleeve having an arm in rotation-transmitting connection with the sleeve, a rotatably driven back off cam, said lever having a second arm in engagement with said cam, a machine element having rotation-transmitting engagement with said sleeve, and a yieldable force-applying member arranged to act on said sleeve in a direction for torque transmission opposite to the torque transmission force applied by said cam through said lever to the sleeve, said lever being reversible with respect to the cam, and said yieldable force-applying member being reversible with respect to said machine element, whereby to enable the cam to exert positive rotational force to the sleeve in either one direction or the opposite direction.

9. In a shaping machine, a supporting structure, a sleeve rotatably mounted in said supporting structure having internal bearing means eccentric to the axis of its rotation, a cutter carrier engaged with said internal bearing means with provision for reciprocating movement parallel to the axis of the sleeve and being displaceable laterally in consequence of rotation of the sleeve, a back off cam, a lever engaged with said cam and having torque transmitting connection with the sleeve, a bar mounted for endwise movement in the supporting structure having torque transmitting engagement with the sleeve, a yieldable force-applying member arranged to apply force to said bar in the direction of rotation opposite to that in which force is applied by said lever, whereby to hold the lever in engagement with the back off cam and take up backlash, and an adjustable stop disposed to be engaged by said bar when the latter is moved in one direction by the action of the back off cam.

10. In a shaping machine, a supporting structure, a sleeve rotatably mounted in said supporting structure having internal bearing means eccentric to the axis of its rotation, a cutter carrier engaged with said internal bearing means with provision for reciprocating movement parallel to the axis of the sleeve and being displaceable laterally in consequence of rotation of the sleeve, a back off cam, a lever engaged with said cam and having torque transmitting connection with the sleeve, a bar mounted for endwise movement in the supporting structure having torque transmitting engagement with the sleeve, a yieldable force-applying member arranged to apply force to said bar in the direction of rotation opposite to that in which force is applied by said lever, whereby to hold the lever in engagement with the back off cam and take up backlash, and an adjustable stop disposed to be engaged by said bar when the latter is moved in one direction by the action of the back off cam, said lever being adapted for placement in different positions wherein it engages the back off cam at one side or the opposite side respectively of the axis of the cam, and said force-applying member and stop being reversible with respect to said bar.

11. In a shaping machine, the combination with a rotatable and reciprocable spindle, of a rotatably mounted sleeve with which the spindle has rotative and reciprocative engagement on an axis parallel and eccentric to the axis about which the spindle turns whereby rotative movement of the sleeve causes lateral displacement of the spindle, a gear coaxial with the spindle in rotation-transmitting engagement therewith, and rotatively supported by the sleeve, a worm meshing with the sleeve arranged with its axis substantially parallel to the direction of said lateral movement of the spindle, mechanism including a differential gearing connected with said worm for rotating it, and including a planet pinion, a back off cam operatively associated with the sleeve for imparting rotary movement to the sleeve, and a second cam operatively associated with the carrier of said planet pinion to cause displacement of the pinion, whereby to impart an incremental angular movement to the worm.

12. In a shaping machine, a supporting structure, a sleeve mounted rotatably in said supporting structure having external and internal bearing surfaces of which the axes are parallel and eccentric to one another, a spindle coaxial with the internal bearing surface of said sleeve in confined and guided relation therewith for endwise movement, means for reciprocating said spindle endwise, means to rotate said spindle, means to turn said sleeve to cause lateral movement of the spindle and means to impart an added incremental rotation to said spindle.

EDWARD W. MILLER.

REFERENCES CITED

The following references are of record in the file of this patent:

UNITED STATES PATENTS

| Number | Name | Date |
| --- | --- | --- |
| 2,125,873 | Aeberli | Aug. 9, 1938 |
| 2,364,065 | Frederichs | Dec. 5, 1944 |